(No Model.)

M. E. BEACH & A. BURCH.
SAW SETTING AND JOINTING DEVICE.

No. 272,625. Patented Feb. 20, 1883.

WITNESSES:
Chas. T. Howell,
C. Sedgwick

INVENTOR:
M. E. Beach
A. Burch
BY Munn & Co
ATTORNEYS.

UNITED STATES PATENT OFFICE.

MILLARD E. BEACH AND ALBERT BURCH, OF CADILLAC, MICHIGAN.

SAW SETTING AND JOINTING DEVICE.

SPECIFICATION forming part of Letters Patent No. 272,625, dated February 20, 1883.

Application filed August 15, 1882. (No model.)

To all whom it may concern:

Be it known that we, MILLARD E. BEACH and ALBERT BURCH, of Cadillac, in the county of Wexford and State of Michigan, have invented a new and Improved Saw Setting and Jointing Tool, of which the following is a full, clear, and exact description.

Our invention consists in a combination tool or implement for use in setting and jointing saw-teeth, as hereinafter described and claimed.

Reference is to be had to the accompanying drawings, forming a part of this specification, in which similar letters of reference indicate corresponding parts in all the figures.

Figure 1:
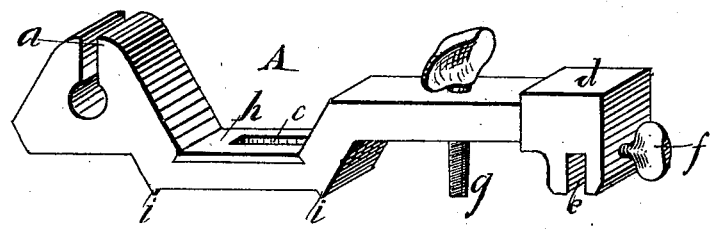
Figure 2:
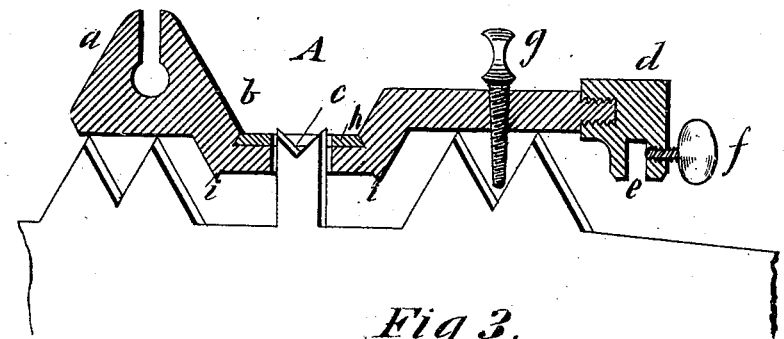
Figure 3:
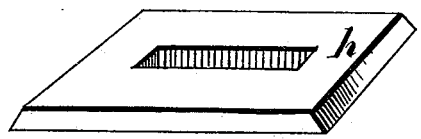

Figure 1 is a perspective view of the implement. Fig. 2 is a sectional side view, showing the device as applied to use. Fig. 3 is a detail view.

A is the tool or implement, one end of which is formed with a slot, $a$, for passing upon the teeth in setting them. Next to this end the tool is formed with a depressed portion, $b$, which is slotted at $c$ to allow certain teeth to extend up through to be jointed; and at the other end, attached by a screw, so as to allow of its removal when not required for use, is a jointer, $d$, formed with a slot, $e$, and provided with a set-screw, $f$, for jointing the other teeth of the saw. This end of the tool is also formed with a screw, $g$, for use in regulating the setting of the teeth.

The depressed portion $b$, with its slot $c$, is intended especially for use with saws having raker-teeth intermediate of the cutting-teeth, as shown in Fig. 2, for gaging and cutting such teeth to the proper length. The application of the tool for this purpose is shown in Fig. 2. The tool rests, as shown, upon the cutting-teeth, with the intermediate raker-teeth projecting through the slot $c$, so that they can be readily filed off to the proper length. To prevent injury to the tool by the file during this operation, the hardened plate $h$, of steel, (shown separately in Fig. 3,) is applied so as to surround the slot $c$, the plate being held in place by undercuts and grooves.

For jointing the other teeth of a saw, a file is to be inserted edgewise in the slot of the jointer $d$ and clamped by means of the screw $f$, so that the tool serves as a handle to the file and the jointer takes against the side of the saw.

In setting a saw the slot $a$ is passed upon a tooth of the saw and the same bent to the right or left, then another tooth is bent in an opposite direction to the first, and so on. After bending or setting the first tooth the tool is placed with the points $ii$ resting against the blade of the saw, and the thumb-screw $g$ adjusted to come in contact with the said bent or set tooth, so that it may be a gage in setting the other teeth—that is to say, if, after bending a tooth, it is found upon placing the tool against the blade that the tooth does not come in contact with the set-screw, or has been bent too far, it is to be bent more or back again, as the case may be, whereby all the teeth will have the same set.

Having thus described my invention, I claim as new and desire to secure by Letters Patent—

1. The tool or implement for jointing and setting saws, formed with the slot $a$ at the end, the depressed portion $b$, slotted at $c$, and provided with the set-screw $g$, substantially as shown and described.

2. A saw set and jointer having the jointer $d$ formed with the slot $e$, and provided with the set-screw $f$, detachably secured to one end thereof, substantially as herein shown and described.

3. A device for setting and jointing saws, consisting of the slotted end $a$, depressed and slotted portion $b$, the jointer $d$, and adjusting-screw $g$, substantially as herein shown and described.

4. A saw set and jointer formed with the slot $a$ at the end, the depressed portion $b$, having the points $i$ on its under face, and provided with the set-screw $g$, substantially as herein shown and described.

MILLARD E. BEACH.
ALBERT BURCH.

Witnesses:
JAMES R. BISHOP,
CHARLES H. MICHOL.